US006981885B2

(12) United States Patent
Oh (10) Patent No.: US 6,981,885 B2
(45) Date of Patent: Jan. 3, 2006

(54) SECURE DIGITAL MEMORY CARD SOCKET

(75) Inventor: Jung Kil Oh, Incheon (KR)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/496,522

(22) PCT Filed: Dec. 11, 2002

(86) PCT No.: PCT/US02/39423

§ 371 (c)(1),
(2), (4) Date: Mar. 18, 2005

(87) PCT Pub. No.: WO03/055009

PCT Pub. Date: Jul. 3, 2003

(65) Prior Publication Data

US 2005/0255730 A1    Nov. 17, 2005

(30) Foreign Application Priority Data

Dec. 11, 2001    (KR) .................. 10-2001-0078064

(51) Int. Cl.
    *H01R 13/62* (2006.01)
(52) U.S. Cl. .................................................. 439/159
(58) Field of Classification Search ............... 439/159, 439/160
    See application file for complete search history.

(56) References Cited

U.S. PATENT DOCUMENTS

| | | | | |
|---|---|---|---|---|
| 6,655,972 B2 * | 12/2003 | Sato | ............................ | 439/159 |
| 6,669,494 B2 * | 12/2003 | Abe | ............................ | 439/159 |
| 6,685,490 B1 * | 2/2004 | Xue et al. | .................... | 439/159 |
| 6,739,911 B2 * | 5/2004 | Wagatsuma et al. | ........ | 439/609 |
| 6,773,280 B2 * | 8/2004 | Sasaki et al. | ............... | 439/159 |
| 6,776,632 B2 * | 8/2004 | Kikuchi et al. | ............. | 439/159 |
| 6,790,061 B1 * | 9/2004 | Lai et al. | ..................... | 439/159 |
| 6,814,596 B2 * | 11/2004 | Yu et al. | ..................... | 439/159 |
| 6,840,786 B2 * | 1/2005 | Sato et al. | ................... | 439/159 |
| 6,846,192 B2 * | 1/2005 | Tien | ........................... | 439/159 |
| 6,863,571 B2 * | 3/2005 | Sato et al. | ................... | 439/630 |
| 6,875,033 B2 * | 4/2005 | Sato et al. | ................... | 439/159 |
| 6,896,555 B1 * | 5/2005 | Su et al. | ..................... | 439/630 |
| 2002/0052132 A1 * | 5/2002 | Sato | ........................... | 439/159 |
| 2002/0142640 A1 * | 10/2002 | Abe | ........................... | 439/260 |

(Continued)

*Primary Examiner*—Ross Gushi
(74) *Attorney, Agent, or Firm*—Charles S. Cohen (57) ABSTRACT

Disclosed is an SD memory card socket for preventing an SD memory card from being accidentally removed from the SD memory card socket. The SD memory card socket includes guide pieces formed on an edge of a connector housing facing a side of the SD memory card so as to form a guide slot therebetween in a longitudinal direction. A slider moves forward and backward in the longitudinal direction along the guide slot when inserting and removing the SD memory card. The slider has a fixing hole formed at a front end and a hidden hole formed at a rear end, the hidden hole being open in a downward direction. A first end of a locking bar is inserted into the fixing hole to allow the locking bar to rotate about the fixing hole, while a second end of the locking bar is inserted into the hidden hole to allow the second end to protrude out of the hidden hole when rotated about the fixing hole. A locking release guide protrusion is formed on an inner face of a guide piece, so as to guide a horizontal part of the locking bar to urge the second end of the locking bar toward insertion into the hidden hole when the slider moves to a home position.

7 Claims, 7 Drawing Sheets

U.S. PATENT DOCUMENTS

| | | | |
|---|---|---|---|
| 2002/0155739 A1 * | 10/2002 | Sato et al. | 439/159 |
| 2003/0013334 A1 * | 1/2003 | Kuroda | 439/159 |
| 2003/0068911 A1 * | 4/2003 | Ooya et al. | 439/159 |
| 2003/0096521 A1 * | 5/2003 | Kikuchi et al. | 439/159 |
| 2003/0139077 A1 * | 7/2003 | Sasaki et al. | 439/159 |
| 2003/0199186 A1 * | 10/2003 | Ji et al. | 439/159 |
| 2003/0224640 A1 * | 12/2003 | Sato et al. | 439/159 |
| 2004/0014342 A1 * | 1/2004 | Yu et al. | 439/159 |
| 2004/0043664 A1 * | 3/2004 | Sato et al. | 439/630 |
| 2004/0092146 A1 * | 5/2004 | Tien | 439/159 |
| 2004/0166713 A1 * | 8/2004 | Lai | 439/159 |
| 2004/0192096 A1 * | 9/2004 | Sato et al. | 439/188 |
| 2004/0242040 A1 * | 12/2004 | Miyazawa et al. | 439/159 |
| 2005/0020137 A1 * | 1/2005 | Tanaka et al. | 439/630 |
| 2005/0037659 A1 * | 2/2005 | Wu | 439/374 |
| 2005/0085114 A1 * | 4/2005 | Su et al. | 439/159 |
| 2005/0101170 A1 * | 5/2005 | Tanaka et al. | 439/159 |
| 2005/0101173 A1 * | 5/2005 | Harasawa | 439/327 |
| 2005/0101174 A1 * | 5/2005 | Harasawa | 439/327 |

* cited by examiner

SECURE DIGITAL MEMORY CARD SOCKET

This application is a 371 of PCT/US02/39423 filed Dec. 11, 2002.

FIELD OF THE INVENTION

The present invention relates to a card socket for receiving a secure digital memory card.

BACKGROUND OF THE INVENTION

Portable digital devices, such as digital cameras, digital camcorders, MP3 players, hand-held PCs, PDAs and the like are widely used and therefore increase the demand for removable storage devices. One type of removable storage device is the flash memory storage device.

With the advent of new technologies and rapid diversification of electronic apparatuses, the market for removable storage devices used in computers and electronic utilities has developed accordingly. Because the portable digital devices require large-scale memory with high quality, demand for inexpensive and large scale removable storage devices is expanding explosively. On the other hand, the diversification of electronic articles has brought about many kinds of technological problems. Even though the flash memory used in most portable devices has advantages with respect to the re-recording and storing of data, it is relatively expensive. Also, due to problems in manufacturing processes used to produce flash memory devices, a reduction in the prices of such devices cannot be expected in the near future.

Flash memory types of removable storage devices include compact flash cards, smart media cards, multimedia cards, secure digital memory cards (or "SD" memory cards) and memory sticks. However, these are not all compatible with one another. Among these removable storage devices, the multimedia card, the SD memory card and the memory stick all have copyright protection functions. However, the SD memory card has shown some advantages as compared to other types of storage devices with respect to data transmission efficiency, etc. SD memory cards are electrically connected to digital devices via a memory card socket. Because a conventional socket for receiving an SD memory card retains the SD memory card within the socket port only by the elastic contact force between electric connecting terminals in the memory card and mating terminals in the socket, the SD memory card can be separated from the socket in conditions that involve large amounts of vibration and impact.

In order to prevent this separation, the use of a cover for preventing the card from separating has been recommended. However, not only conventional cards but module-type cards may be used. The prevention of card separation from the socket is not easily effected with a module-type card due to the size and weight of the module-type card.

Also, because the conventional socket for the SD memory card has separate fitting nails at both sides of the socket housing to fix the SD memory card on a printed circuit board, additional assembly operations added to the manufacturing process of the socket contributes to cost increases and a reduction in productivity.

SUMMARY OF THE INVENTION

Accordingly, an object of the present invention is to provide an SD memory card socket for receiving an SD memory card which prevents the SD memory card from being inadvertently removed from the SD memory card socket. The SD memory card socket according to the present invention includes a push-push mechanism equipped with a locking bar, which is inserted into a hook slot formed at a side of the SD memory card when the latter is completely inserted into the SD card memory socket.

Another object of the present invention is to provide an SD memory card socket with fitting nails formed at both sides of the socket cover. The fitting nails are soldered to corresponding contacts of the printed circuit board. Thus, movement of the SD memory card socket is impeded and distortion or disconnection of the connecting terminals may be minimized.

Another object of the present invention is to provide an SD memory card socket having a design which enables improvements in manufacturing efficiency and reductions in manufacturing costs through simplification of the manufacturing process.

In order to accomplish the above objects, the present invention provides an SD memory card socket for receiving an SD memory card for use in a portable digital device, the card having a hook hole formed on a side thereof. The SD memory card socket comprises a connector housing having a card receiving part for receiving the SD memory card and a plurality of pin holes arranged in parallel. A plurality of connecting terminals is inserted into the plurality of pin holes so as to be electrically connected to a plurality of connecting terminals of the SD memory card. A cover is positioned on an upper part of the connector housing. Guide pieces are formed on an edge of the connector housing so as to form a guide slot therebetween in a longitudinal direction of the housing. A slider moves slidably forward and backward within the guide slot between a first and second position during insertion and removal of the SD memory card. A fixing hole is formed at a front end of the slider and a hidden hole is formed at a rear end of the slider. A locking bar is provided having a horizontal portion extending between the fixing hole and the hidden hole, and first and second ends of the locking bar are bent upwardly from the horizontal portion. The first end of the locking bar is inserted into the fixing hole to allow the locking bar to rotate within a predetermined range and the second end of the locking bar is inserted into the hidden hole to allow the second end to protrude out of the hidden hole when the locking bar is rotated about the first end. A locking guide protrusion is formed in the middle portion of the guide piece and located so as to guide the second end of the locking bar out of the hidden hole of the slider and into the hook hole of the SD memory card during insertion of the SD memory card. A locking release guide protrusion is formed on an inner face of a guide piece so as to guide the horizontal portion of the locking bar to force the second end of the locking bar to be inserted into the hidden hole when the slider moves to its first position.

The locking guide protrusion may be formed with an inclined side surface extending from the front end to the rear end and facing a side of the SD memory card formed with the hook hole.

The locking release guide protrusion may be formed with an inclined side surface extending from the rear end to the front end and facing a side of the slider.

Also, the SD memory card socket may further comprise slide pieces protruding downward from a bottom surface of the slider at a first position, behind the hidden hole, and a second position, in front of the fixing hole, so as to separate a bottom surface of the slider from the surface of the guide slot.

The heights of the locking guide protrusion and the locking release guide protrusion with respect to a bottom surface of the slider may be determined with reference to a height from the bottom surface of the slider to a surface of the guide slot.

Also, the SD memory card socket may further comprise fitting nails formed at both sides of the cover and soldered to corresponding contacts on a printed circuit board when the SD memory card socket is installed on the printed circuit board.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Hereinafter, embodiments of the present invention will be described with reference to the accompanying drawings. In the following description and drawings, the same reference numerals are used to designate the same or similar components, and so repetition of the description of the same or similar components will be omitted.

As shown in FIGS. 1–4, an SD memory card socket 100 of the present invention includes a connector housing 110 formed with a card receiving part 112 for receiving an SD memory card 200, a plurality of connecting terminals 120 extending in parallel from a rear end to a front end of connector housing 110, and a cover 130 for covering an upper part of connector housing 110. Guide pieces 140, 140a, and 140b form a guide slot 142 on an upper part of an edge of connector housing 110. A slider 150 has a fixing hole 152 formed at a front end thereof and a hidden hole 154 formed at a rear end thereof. Hidden hole 154 opens downwardly for moving back and forth along guide slot 142. A locking bar 160 is included with first and second ends bent upwardly, the first end of locking bar 160 being inserted into fixing hole 152 to allow locking bar 160 to rotate within a predetermined range, and the second end of locking bar 160 being inserted into hidden hole 154 to allow the second end to protrude out of hidden hole 154 when rotated about the locking bar first end. A locking guide protrusion 170 guides the second end of locking bar 160 into insertion into a hook hole 202 of SD memory card 200 when SD memory card 200 is inserted into socket 100. A locking release guide protrusion 180 guides a horizontal part of locking bar 160 to force the second end of locking bar 160 into insertion into hidden hole 154 when slider 150 moves to a first, original position.

During operation of SD memory card socket 100, when SD memory card 200 is to be received into card receiving part 112, slider 150 slidably moves in the insertion direction of the card while pushing against SD memory card 200 in a direction opposite the insertion direction. Thus, the second end of locking bar 160 is guided by locking guide protrusion 170 from hidden hole 154 into hook hole 202 of SD memory card 200 during insertion of the card. Accordingly, by inserting the second end of locking bar 160 into hook hole 202 of SD memory card 200, SD memory card 200 is secured in card receiving part 112 of SD memory card socket 100. SD memory card 200 is not released from SD card memory socket 100 because the second end of locking bar 160 resides within hook hole 202.

When SD memory card 200 is received into card receiving part 112, slider 150 moves in a card insertion direction and is locked in an inserted position. In this situation, if an additional pushing force is exerted on SD memory card 200 in the card insertion direction, the second end of locking bar 160 withdraws from hook hole 202 and slider 150 is released and returns to its first, original position by the restoring action of elastic spring 190. Accordingly, SD memory card 200 withdraws from SD memory card socket 100.

Slider 150 can be maintained in its second, retreated position by the action of pushing card 200 into socket 100 such that locking bar end enters hook hole 202, and slider 150 moves back to its original position by pushing card 200 inward a second time to release the locking bar second end from hole hook 202, thereby allowing a restoring force of elastic spring 190 to push slider 150 outwardly.

Connector housing 110 forms an outer contour of SD memory card socket 100 and includes card receiving part 112 for receiving SD memory card 200 at its front side and a plurality of pin receiving holes 114 for receiving connecting terminals 120, which are arranged in parallel, at its rear side. With respect to the connecting terminals, a more detailed description will be given below.

Connecting terminals 120 are provided for electrically connecting SD memory card 200 to a printed circuit board (not shown). The connecting terminals are inserted into respective pin receiving holes 114 arranged in parallel at the rear side of connector housing 110.

Each connecting terminal 120 includes a first end 122 for soldering a connecting terminal to a corresponding contact (not shown) on an underlying printed circuit board and a second end 124 for electrical connection to a corresponding connecting terminal 210 of SD card 200.

Cover 130 is provided on an upper part of connector housing 110 to prevent SD memory card 200 from being separated from card receiving part 112. Cover 130 fixes onto the upper part of connector housing 110 by engagement of a plurality of hook holes 132 formed along the side of cover 130 into a corresponding plurality of hooks 116 formed along the side of connector housing 110.

Figure 1:
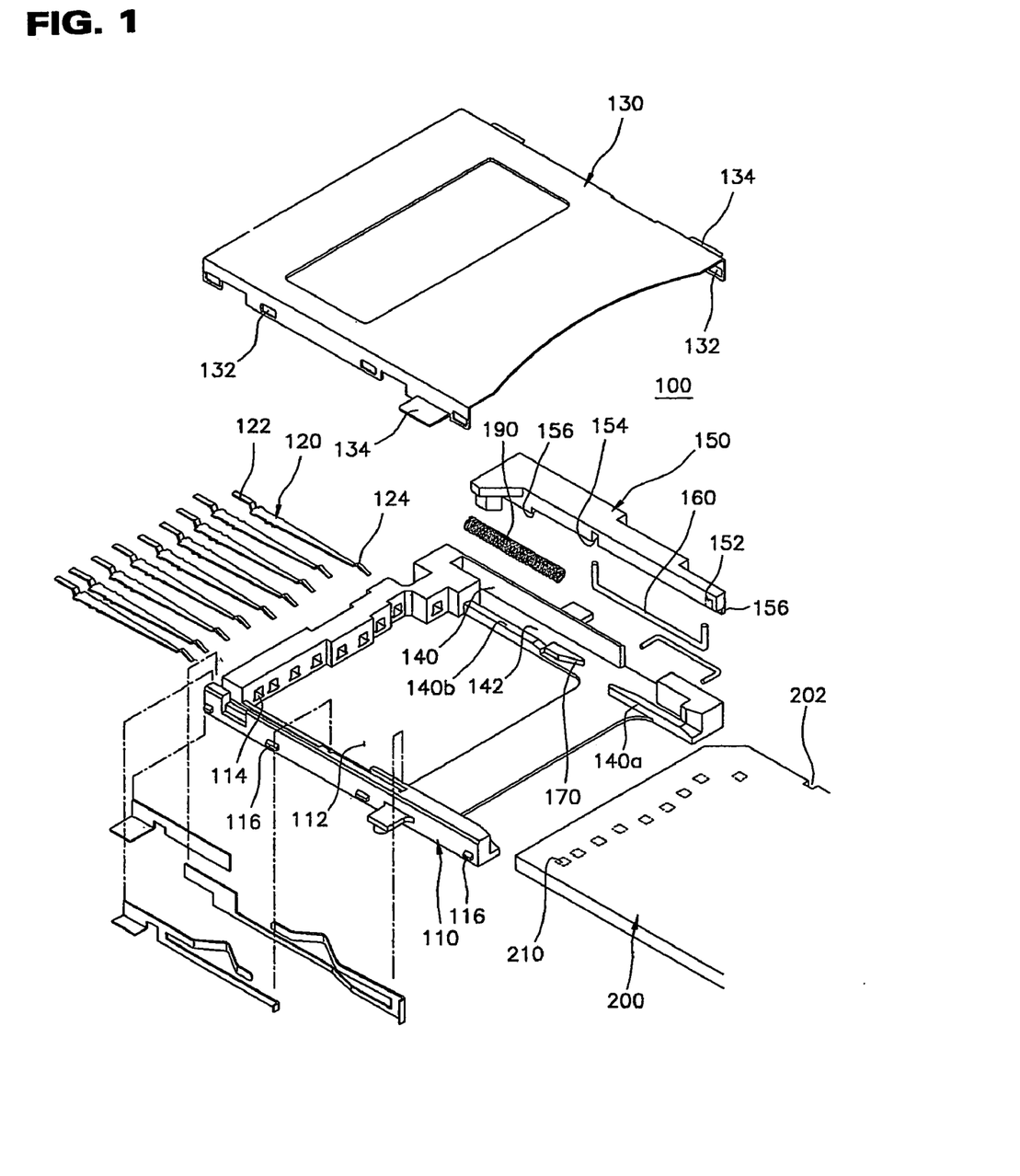
FIG. 1 is an exploded perspective view of an SD memory card socket according to the present invention.

Referring to FIG. 1, in order to minimize or prevent connecting terminals 120 from being bent due to vibration or movement of SD memory card socket 100, fitting nails 134 are formed at an appropriate position along both sides of cover 130. In use, the fitting nails fix SD memory card socket 100 with respect to the printed circuit board. In other words, fitting nails 134 are each soldered to corresponding contacts on the printed circuit board.

Guide pieces 140, 140a, and 140b are provided for guiding slider 150 backward and forward between its first, original and second, retreated positions. Guide pieces 140, 140a, 140b are formed on an upper surface of connector housing 110 and form a guide slot 142 in a longitudinal direction. There is an opening between guide pieces 140a and 140b.

Slider 150 is provided for locking and releasing SD memory card 200 by moving slidably forward and backward along guide slot 142. Slider 150 is guided by guide pieces 140, 140a, and 140b for moving backward (toward its original position) and forward (toward a retreated position) along guide slot 142. On a bottom surface of a front side of slider 150, fixing hole 152 is formed. Hidden hole 154 is formed at a rear side of the slider and opens inwardly.

Slider 150 is formed with slide pieces 156, which protrude downwardly from a bottom surface of slider 150 at a first position, behind hidden hole 154, and at a second position in front of fixing hole 152. Slide pieces 156 serve to separate the bottom surface of slider 150 from a bearing surface of guide slot 142. Slider 150 slides along guide slot 142 with a predetermined spacing between the bottom surface of slider 150 and the bearing surface of guide slot 142.

On an outer face of slider 150, a guide slot (not shown) is provided for locating and guiding a second end of a push locking bar (not shown). The push locking bar has first and second ends bent away in the same direction from a horizontal portion. Here, the first end of the push locking bar is inserted into one side of connector housing 110 to allow a rotation within a predetermined range, while the second end of the push locking bar is located at the guide slot (not shown) formed at the outer face of slider 150.

Locking bar 160 locks and releases SD memory card 200 with respect to card receiving part 112. Before inserting SD memory card 200 into card receiving part 112, the second end of locking bar 160 is positioned in hidden hole 154. After inserting SD memory card 200 into card receiving part 112, the second end of locking bar 160 rotates about fixing hole 152 and moves into hook hole 202.

Locking bar 160 has the horizontal portion and first and second ends bent upwardly from the horizontal portion. The first end of locking bar 160 is inserted into fixing hole 152 of slider 150 so as to serve as a rotation axis, while the second end of locking bar 160 rotates between hidden hole 154 of slider 150 and hook hole 202 of SD memory card 200 so as to lock (or release) SD memory card 200 when inserting (or removing) the card into (or from) card receiving part 112.

Figure 2:
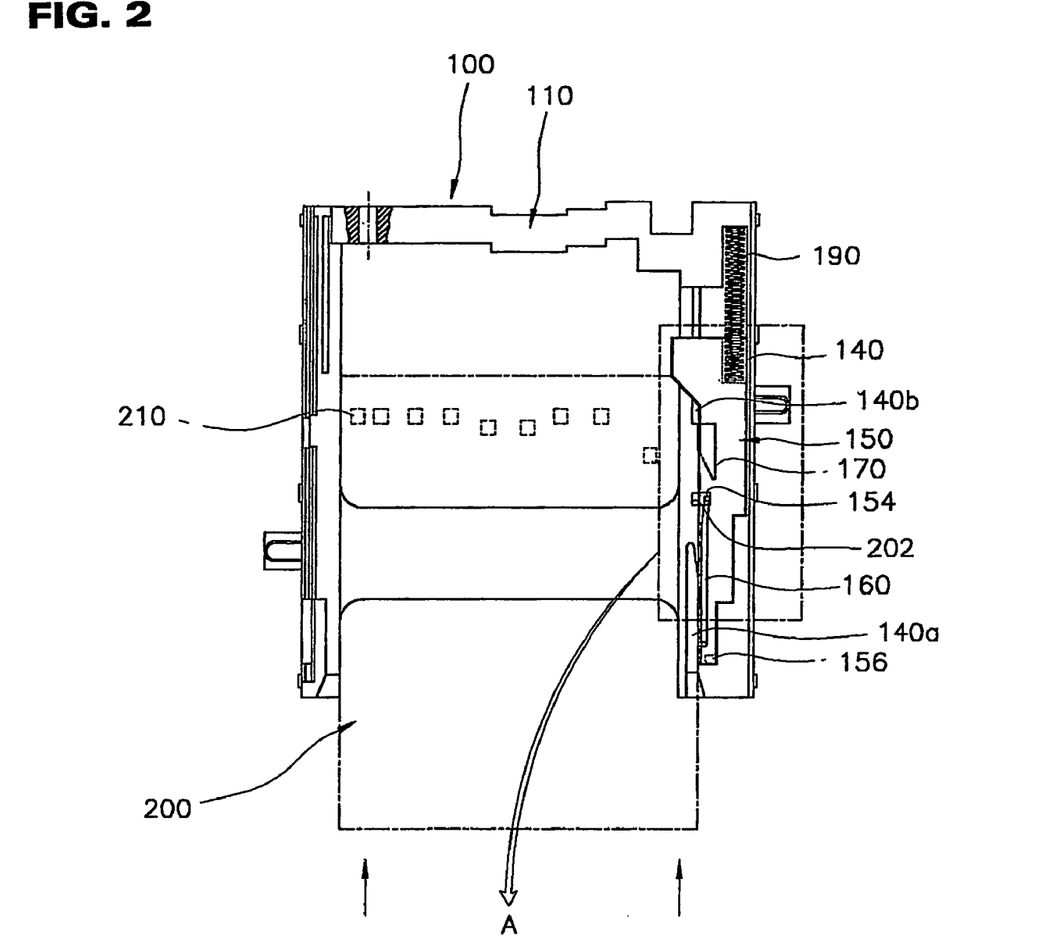
FIG. 2 is a plan view of the SD memory card socket of FIG. 1, prior to insertion of the SD memory card.
Figure 3:
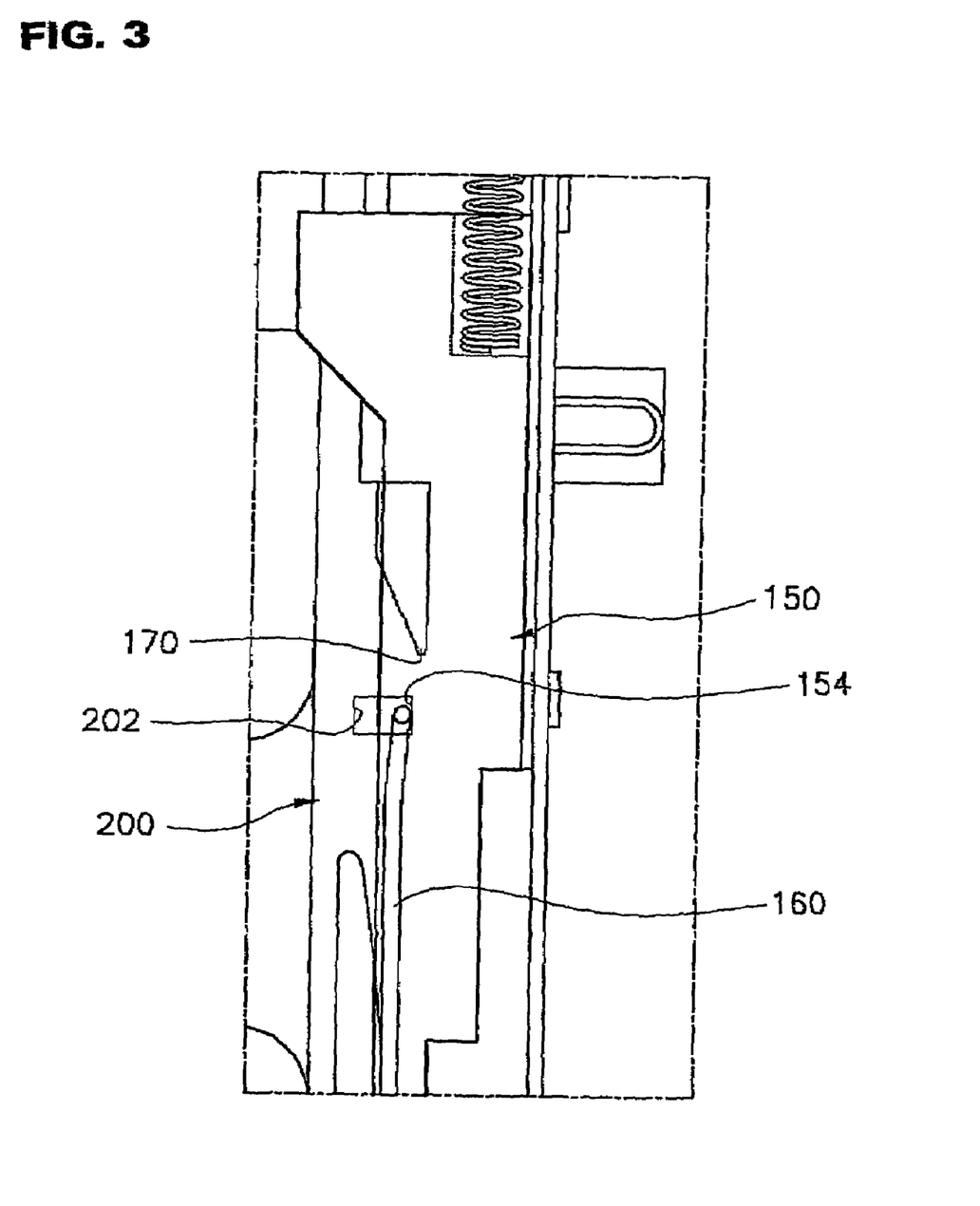
FIG. 3 is an enlarged view of Box "A" as shown in FIG. 2.

Referring to FIGS. 1–3, locking guide protrusion 170 is provided for guiding the second end of locking bar 160 toward hook hole 202 to lock card 200 in an inserted position. Locking guide protrusion 170 is formed between guide pieces 140a and 140b. When inserting SD memory card 200 into card receiving part 112, locking guide protrusion 170 guides the second end of locking bar 160 from hidden hole 154 into hook hole 202 so as to lock SD memory card 200 in card receiving part 112. Here, locking guide protrusion 170 is formed with an inclined side surface extending from the front end to the rear end and facing hook hole 202 of SD memory card 200.

Referring to FIGS. 1–4, locking release guide protrusion 180 is provided for guiding the second end of locking bar 160 in a direction required to release the locking bar second end from engagement with hook hole 202 in SD memory card 200. Locking release guide protrusion 180 may be formed on an inner side of guide piece 140a. When slider 150 returns to its home position, locking release guide protrusion 180 serves to guide the horizontal portion of locking bar 160 so as urge the second end of locking bar 160 into hidden hole 154.

Elastic spring 190 functions to bias and return slider 150 to its original position. Elastic spring 190 is positioned between a rear end of guide slot 142 and a rear end of slider 150 and exerts a force urging the slider toward its home position.

FIGS. 4–7 illustrate the operation of locking bar 160 during insertion of SD memory card 200 into an SD memory card socket. The operation of inserting SD memory card 200 into SD memory card socket 100 is described below.

Before inserting SD memory card 200 into SD memory card socket 100, slider 150 is located at its original position, i.e., at the front end of connector housing 110, and is maintained in this position by the elastic force of spring 190. In addition, the second end of locking bar 160 is positioned in hidden hole 154 of slider 150 due to action of locking releasing guide protrusion 180 on locking bar 160. In other words, the second end of locking bar 160 does not protrude in a direction toward SD memory card 200, as a result of the limiting action of locking releasing guide protrusion 180.

Figure 4:
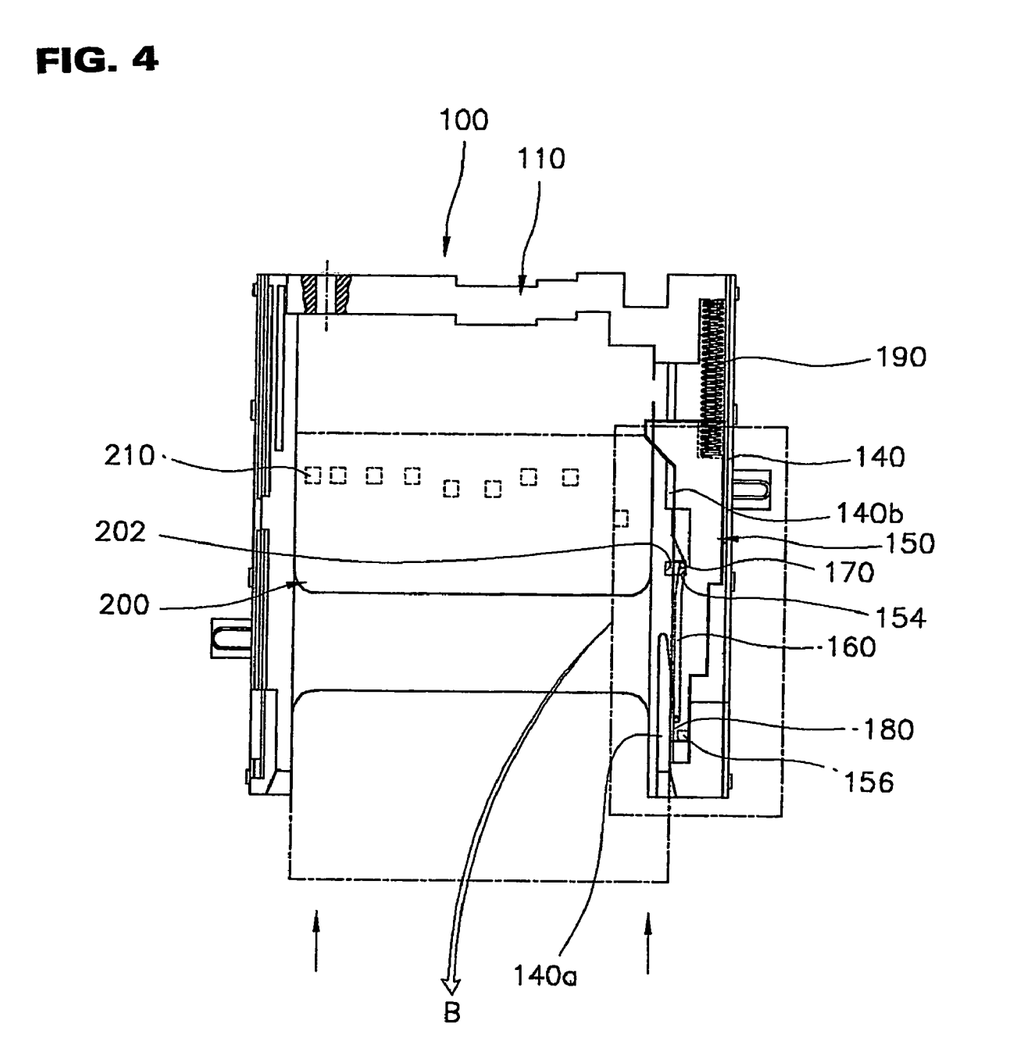
FIG. 4 is a plan view illustrating operation of a locking bar during a process of inserting an SD memory card into the SD memory card socket.
Figure 5:
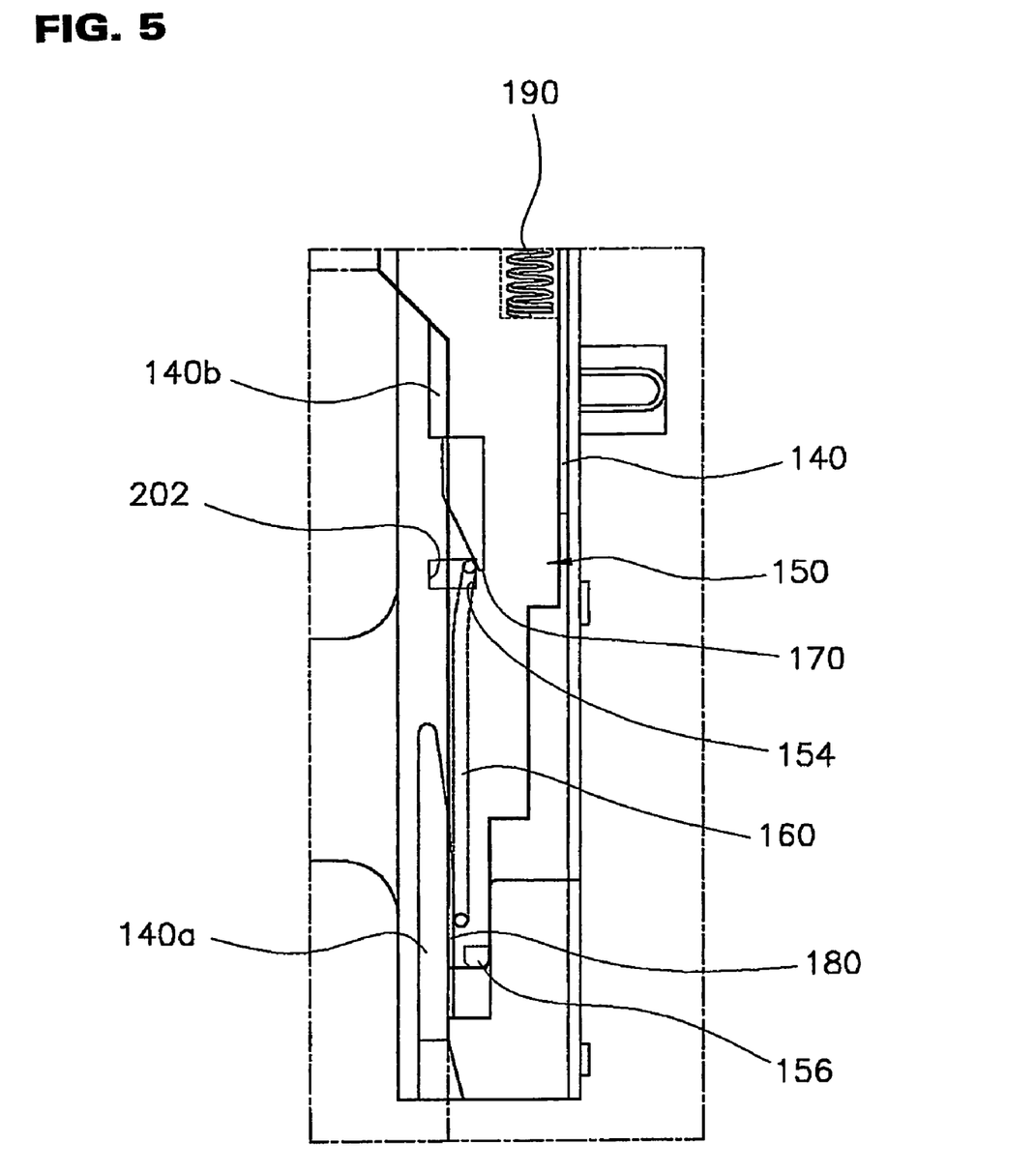
FIG. 5 is an enlarged view of Box "B" as shown in FIG. 4.

Referring to FIGS. 4–5, when inserting SD memory card 200 into SD memory card socket 100, slider 150 moves in the card insertion direction when SD memory card 200 is inserted into card receiving part 112. Thus, locking bar 160 is released from the restrictions imposed by locking release guide protrusion 180, and the second end of locking bar 160 may rotate about fixing hole 152 within a predetermined range.

Figure 6:
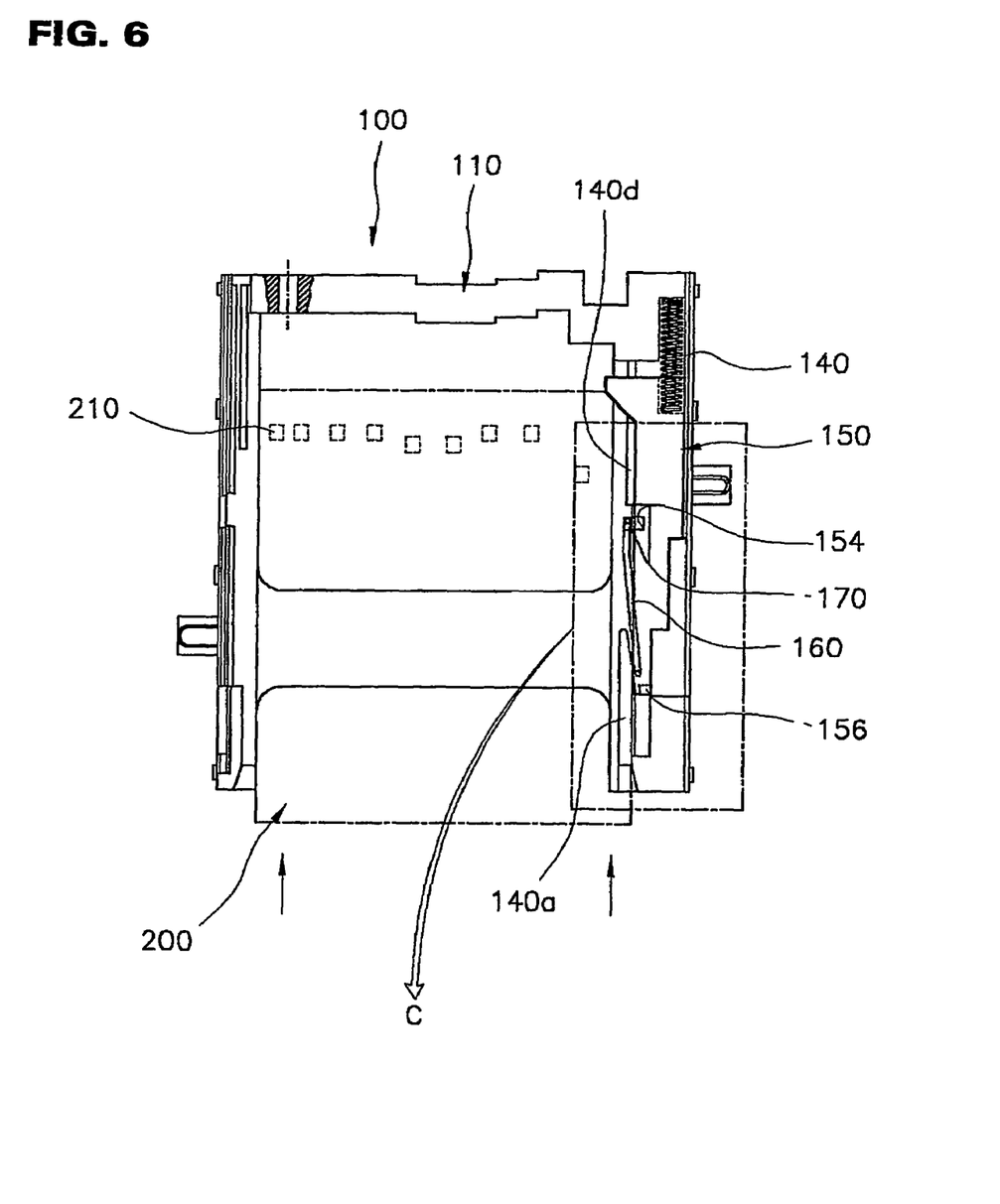
FIG. 6 is a plan view of the SD memory card socket of FIG. 1 after insertion of the SD memory card.
Figure 7:
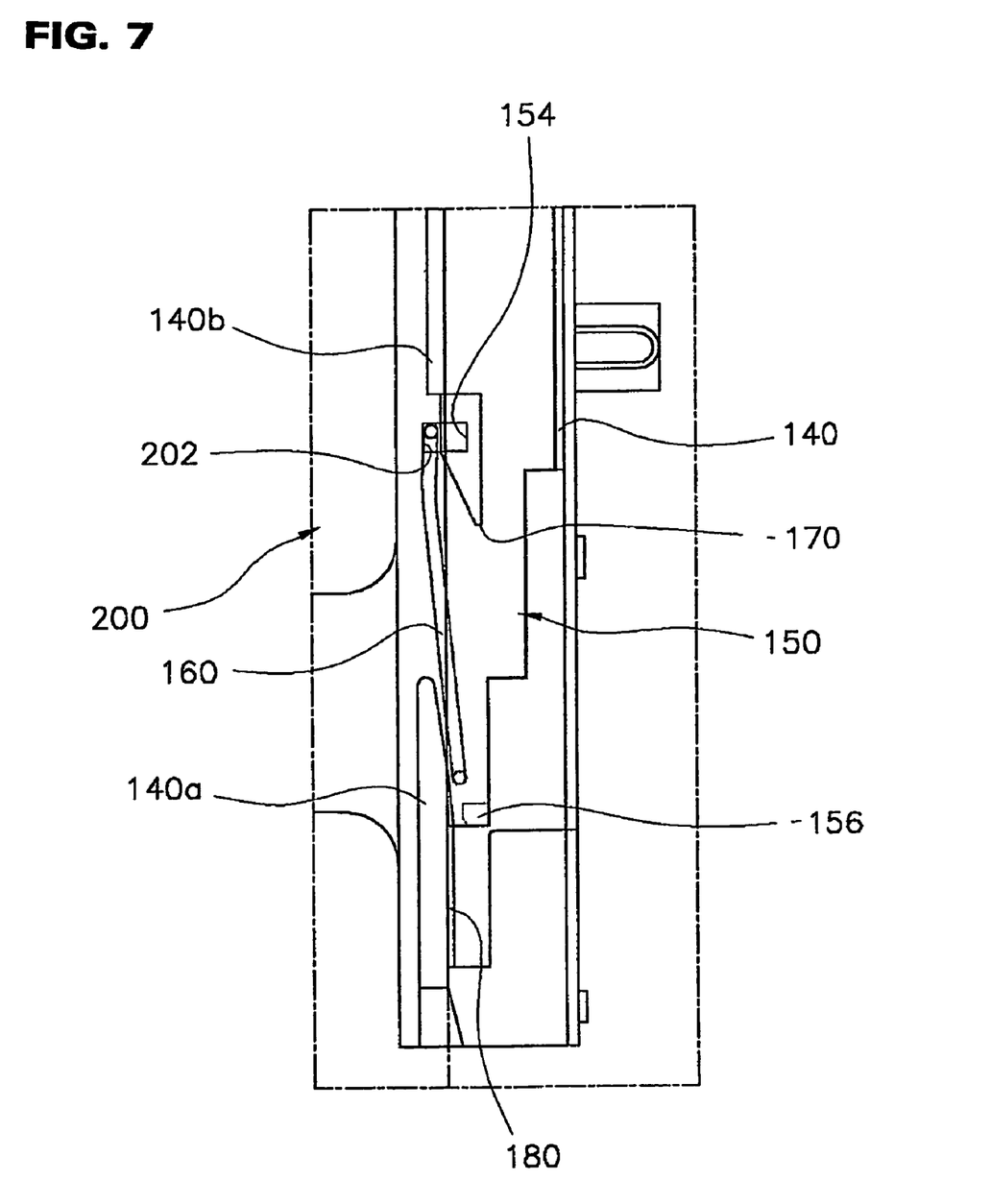
FIG. 7 is an enlarged view of Box "C" as shown in FIG. 6.

Referring to FIGS. 6–7, when the SD memory card is completely received in card receiving part 112, the second end of locking bar 160 is guided by locking guide protrusion 170 toward, and then into, hook hole 202 of SD memory card 200. Accordingly, the SD memory card is locked by locking bar 160 and it can not be removed therefrom without releasing locking bar 160.

In this state, slider 150 is maintained in an inserted position by the push locking bar (not shown). As stated previously, the push locking bar has a horizontal portion and first and second ends bending in the same direction from the horizontal portion. A first end of the push locking bar is inserted into a side face of connector housing 110 so as to allow rotation within a predetermined range, while a second end of the push locking bar is located in a guide slot (not shown) formed at an outer side of slider 150.

In order to remove SD memory card 200 from SD memory card socket 100, an external force is applied to SD memory card 200 in the card insertion direction. Slider 150 is then released from a locked state by the push locking bar and returns to its original position by the action of the restoring force of elastic spring 190. As slider 150 returns to its original position, SD memory card 200 moves out of contact with SD memory socket 100 in the direction of ejection and the horizontal portion of locking bar 160 rotates toward slider 150 by action of locking release guide protrusion 180 on locking bar 160.

Accordingly, the second end of locking bar 160 comes out of hook hole 202 of SD memory card 200 and enters into hidden hole 154 of slider 150, thereby releasing SD memory card 200 from a locked condition. SD memory card 200 is ejected from SD memory card socket 100 as a result of locking bar 160 releasing SD memory card 200 from its locked condition.

According to the invention, the SD memory card cannot be accidentally removed from the SD memory card socket due to the push-push mechanism equipped with a locking bar, which is inserted into a hook slot formed at a side of the SD memory card when the latter is completely inserted into the SD card memory socket.

Furthermore, since the SD memory card socket according to the present invention is provided with fitting nails formed at both sides of the cover of the SD memory card which are soldered to corresponding contacts on the printed circuit board, vibration and movement of the SD memory card socket are prevented and risk of distortion of the connecting terminals is minimized.

Finally, manufacturing efficiency of the subject SD memory card socket is improved and manufacturing costs reduced through simplification of the manufacturing process.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An SD memory card socket (100) for receiving an SD memory card (200), the card having a hook hole (202) formed on a side thereof, the SD memory card socket comprising:
   a connector housing (110) having;
   a card receiving part (112) for receiving the SD memory card; and
   a plurality of pin holes (114);
   a plurality of connecting terminals (120) inserted into the plurality of pin holes for electrical connection to a plurality of connecting terminals of the SD memory card; guide pieces (140) formed on an edge of the connector housing forming a guide slot (142) therebetween in a longitudinal direction of the housing,
   a slider (150) slidably movable along the guide slot between a first and second position, the slider having a fixing hole (152) formed at one end thereof and a hidden hole (154) formed at the opposite end thereof,
   a locking bar (160) having first and second ends, the first end being inserted into the fixing hole to allow the locking bar to rotate about the fixing hole, and the second end of the locking bar being inserted into the hidden hole such that the second end protrudes out of the hidden hole when the locking bar is rotated about the fixing hole;
   a locking guide protrusion (170) formed on the housing for guiding the second end of the locking bar along the hidden hole toward insertion into the hook hole of the SD memory card during insertion of the SD memory card into the card socket; and
   a locking release guide protrusion (180) formed on the housing for urging the second end of the locking bar into the hidden hole when the slider moves to its first position.

2. The SD memory card socket of claim 1, wherein the locking bar has a horizontal portion extending between the fixing hole and the hidden hole, and the first and second ends of the locking bar are bent upwardly from the horizontal portion.

3. The SD memory card socket of claim 1, wherein the locking guide protrusion is formed with an inclined side surface extending from a front end toward a rear end of the connector housing.

4. The SD memory card socket of claim 3, wherein the locking release guide protrusion is formed with an inclined side surface extending from the rear end of the housing toward the front end of the housing.

5. The SD memory card socket of claim 1, further comprising slide pieces (156) protruding downward from a bottom surface of the slider so as to separate the bottom surface of the slider from a bearing surface of the guide slot.

6. The SD memory card socket of claim 5, wherein locations of the locking guide protrusion and the locking release guide protrusion are determined with reference to a spacing between a bottom surface of the slider and the bearing surface of the guide slot.

7. The SD memory card socket as claimed in claim 6, further comprising a cover (130) for covering an upper part of the connector housing and fitting nails (134) formed at sides of the cover for soldering to corresponding contacts of a printed circuit board.

* * * * *